United States Patent Office.

THOMAS COMBS, OF YONKERS, NEW YORK.

Letters Patent No. 102,224, dated April 26, 1870.

IMPROVED OINTMENT.

The Schedule referred to in these Letters Patent and making part of the same

I, THOMAS COMBS, of Yonkers, in the county of Westchester and State of New York, have invented a certain medical composition called "Combs' Scrofula Ointment," of which the following is a specification.

The nature of my invention consists in combining three simple ingredients in proportionate quantities, which produce a healing balsam or ointment from which beneficial results are obtained by its application to the eruptions of the human body; the said ointment being composed, and of about the proportions following, viz:

First, one ounce of hellebore; second, one ounce of red precipitate; and third, one pound of fresh butter.

These ingredients I mix together in an earthen or other vessel, with a spatula, and I close said vessel at its mouth with a stopper, and place the vessel in a warm room for three days, stirring up the compound three or four times a day. On the fourth day my ointment is ready for use, when, by a gentle rubbing of the same, on salt rheum, corroding fetter, barber or Jackson's itch, scrofula, and other eruptions of the human body are removed in a short time, as can be proved from many successful experiments.

Besides this, my ointment will be found beneficial for diseases of the human hair.

I claim as my invention—

The manufacture or preparation of a medical compound which I denominate "Combs' Scrofula Ointment," of the ingredients in the proportions and for the purposes set forth.

In testimony whereof I have hereunto set my signature this 8th day of March, 1870.

THOMAS COMBS.

Witnesses:
ARTHUR NEILL,
EMILE MOLTZ.